US007925765B2

(12) United States Patent
Chandra et al.

(10) Patent No.: US 7,925,765 B2
(45) Date of Patent: Apr. 12, 2011

(54) COOPERATIVE DIAGNOSIS IN A WIRELESS LAN

(75) Inventors: Ranveer Chandra, Kirkland, WA (US); Venkata N. Padmanabhan, Sammamish, WA (US); Ming Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 742 days.

(21) Appl. No.: 11/400,103

(22) Filed: Apr. 7, 2006

(65) Prior Publication Data

US 2007/0239876 A1     Oct. 11, 2007

(51) Int. Cl.
   *G06F 15/16* (2006.01)
(52) U.S. Cl. .................. 709/228; 709/227; 340/825.01; 340/825.02; 340/825.03; 340/825.04
(58) Field of Classification Search .................. 709/228, 709/227, 220, 221; 340/825.01, 825.02, 340/825.03, 825.04
   See application file for complete search history.

(56) References Cited

U.S. PATENT DOCUMENTS

| | | | | |
|---|---|---|---|---|
| 5,903,626 A | * | 5/1999 | Iglehart et al. | 379/28 |
| 5,966,427 A | * | 10/1999 | Shaffer et al. | 379/15.05 |
| 6,178,527 B1 | | 1/2001 | Vadales | |
| 6,230,185 B1 | * | 5/2001 | Salas et al. | 709/205 |
| 6,249,812 B1 | * | 6/2001 | Cromer et al. | 709/221 |
| 6,260,160 B1 | * | 7/2001 | Beyda et al. | 714/27 |
| 6,286,038 B1 | * | 9/2001 | Reichmeyer et al. | 709/220 |
| 6,370,599 B1 | * | 4/2002 | Anand et al. | 710/15 |
| 6,751,196 B1 | | 6/2004 | Hulyalkar et al. | |
| 6,799,047 B1 | | 9/2004 | Bahl et al. | |
| 6,865,371 B2 | * | 3/2005 | Salonidis et al. | 455/41.1 |
| 6,895,532 B2 | * | 5/2005 | Raynham | 714/46 |
| 6,939,331 B2 | | 9/2005 | Ohshima | |
| 6,981,047 B2 | | 12/2005 | Hanson et al. | |
| 7,159,026 B2 | * | 1/2007 | Lau et al. | 709/226 |
| 7,295,524 B1 | * | 11/2007 | Gray et al. | 370/254 |

(Continued)

FOREIGN PATENT DOCUMENTS

EP          1355448 A2     10/2003

(Continued)

OTHER PUBLICATIONS

AirTight Networks, Product Literature on, SpectraGuard Enterprise; downloaded from: http://www.airtightnetworks.net/productsand_services/sg_enterprise.html, on Feb. 8, 2006.

(Continued)

*Primary Examiner* — Joseph Thomas
*Assistant Examiner* — Eric W Shepperd
(74) *Attorney, Agent, or Firm* — Wolf, Greenfield & Sacks, P.C.

(57) ABSTRACT

Communication software to aid portable computers monitor, and correct problems accessing a network through a wireless access point. The software controls the exchange of information with other portable computers in the vicinity of the wireless access point. The information exchanged may be used to diagnose problems at the wireless layer, the network layer, the transport layer or the application layer. The information exchanged may provide information about the configuration of computers that successfully or unsuccessfully communicate through the wireless access point. A portable computer receiving this configuration information may compare it to similar information about its own configuration to diagnose problems. Such software may be of particular benefit for portable computers experiencing difficulty connecting to a network at a wireless hot spot.

20 Claims, 8 Drawing Sheets

U.S. PATENT DOCUMENTS

| | | | |
|---|---|---|---|
| 7,339,914 B2* | 3/2008 | Bhagwat et al. | 370/338 |
| 2002/0157090 A1* | 10/2002 | Anton, Jr. | 717/178 |
| 2002/0176366 A1* | 11/2002 | Ayyagari et al. | 370/245 |
| 2002/0181501 A1 | 12/2002 | Nova et al. | |
| 2003/0217289 A1* | 11/2003 | Ammon et al. | 713/201 |
| 2004/0054766 A1* | 3/2004 | Vicente | 709/223 |
| 2004/0066313 A1* | 4/2004 | Ong et al. | 340/870.11 |
| 2004/0103278 A1 | 5/2004 | Abhishek et al. | |
| 2004/0203464 A1 | 10/2004 | Katz | |
| 2004/0223469 A1* | 11/2004 | Bahl et al. | 370/331 |
| 2005/0025181 A1 | 2/2005 | Nazari | |
| 2005/0169185 A1* | 8/2005 | Qiu et al. | 370/241 |
| 2005/0185589 A1* | 8/2005 | Berbam et al. | 370/241 |
| 2005/0220054 A1 | 10/2005 | Meier et al. | |
| 2005/0288009 A1 | 12/2005 | Poletti | |
| 2006/0068811 A1* | 3/2006 | Adya et al. | 455/456.2 |
| 2006/0143309 A1* | 6/2006 | McGee et al. | 709/250 |
| 2006/0215668 A1* | 9/2006 | Sethi et al. | 370/401 |
| 2006/0227725 A1* | 10/2006 | Huotari et al. | 370/254 |
| 2007/0197206 A1* | 8/2007 | Olson et al. | 455/423 |
| 2008/0205317 A1* | 8/2008 | Piipponen et al. | 370/311 |

FOREIGN PATENT DOCUMENTS

| | | |
|---|---|---|
| WO | WO 03088587 A1 | 10/2003 |
| WO | WO 2004073259 A1 | 8/2004 |

OTHER PUBLICATIONS

Aruba Networks, Product Literature on, Mobility Management System; downloaded from: http://www.arubanetworks.com/products/mobility-management-system/, on Feb. 8, 2006.

Elixar, Inc., Product Literature on, AirTraf 1.0; downloaded from: http://www.elixar.com/corporate/history/airtraf-1.0/airtraf_capabilities.php, on Feb. 8, 2006.

MacStumbler, Product Literature on MacStumbler 0.75b; downloaded from: http://www.macstumbler.com/ on Feb. 8, 2006.

NetStumbler, Product Literature on NetStumbler v0.4.0 Release Notes; downloaded from http://www.stumbler.net/redme/readme_0_4_0.html, on Feb. 8, 2006.

* cited by examiner

COOPERATIVE DIAGNOSIS IN A WIRELESS LAN

BACKGROUND

Wireless networks are widely used, frequently being deployed in homes, offices and at wireless "hot spots." Wireless hot spots are usually in public places where users can connect to a network, often for a fee, through a wireless access point.

To facilitate widespread use of wireless networking, protocols for connecting to and communicating through a wireless access point have been standardized. For example, many wireless networks operate according to a protocol specified in the IEEE 802.11 standard. Standardizing wireless protocols makes it easier for a computer to connect to a wireless network through an access point. Standardization is particularly important for connection at a hot spot where portable computers, which could be owned and configured by many different people, are brought to the hot spot. Even though the hot spot may be configured by someone who has no knowledge of and no control over the portable computers that connect to a network through the wireless access point, if both the portable computers and wireless access point operate according to the same protocol, connection should be possible.

Despite standardization, it is still possible that a portable computer may not gain a desired level of network access through a wireless access point. Problems may arise because a portable computer is not configured properly. For example, the wireless access point may not accept the security settings on the portable computer or the portable computer may attempt to connect to a port that is blocked at the wireless access point. A mis-configuration of the portable computer also may interfere with network access in other ways, such as by precluding interaction with a DHCP, DNS or web proxy server.

Further, hardware problems in either the portable computer or the wireless access point may prevent reliable exchange of information. Also, radio frequency signals may propagate with poor quality, which may limit or preclude network access. Such signal transmission problems can arise if the portable computer is out of range of the wireless access point or excessive radio frequency noise in the vicinity of the wireless access point or the portable computer interferes with signal transmission.

Consequently, users of portable computers may be prevented from accessing a network through a wireless access point for any of a number of reasons. Identifying and correcting the source of a problem interfering with network access may be particularly vexing for users of portable computers attempting to access a network at a wireless hot spot. Error sources not found in traditional wired networks may be introduced by the wireless link between the portable computer and the wireless access point. Additionally, wireless hot spots are generally self-service and do not have support staff to aid in problem resolution. To compound the user's difficulty, many problems interfering with network access may exhibit the same symptoms as other problems, making it difficult for a user to identify the source of any particular problem.

SUMMARY OF INVENTION

The invention relates to the diagnosis and/or repair of network access problems experienced by hosts accessing a wireless network. Hosts in the vicinity of an access point obtain status information about their connectivity to the network and their configuration. A host experiencing a network access problem may send a request for information to other hosts in the vicinity. In reply, one or more hosts may provide status information. A host experiencing a problem may use this status information to diagnose or repair the problem.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

A user's experience in accessing a network through a wireless access point may be significantly improved with a system that can aid in the diagnosis of network access problems. In some embodiments, the system is implemented in software within host computers designed to control access to a network through a wireless access point. The software in each computer may collect status information concerning network access by that host through the access point and on the configuration of the host. This status information may be shared among the hosts in the vicinity of the wireless access point. A host experiencing an access problem may receive status information from other hosts and may process the status information to diagnose the access problem. Such a system may be of particular benefit for users of hosts, such as portable computers equipped with wireless network interface cards, seeking access to a network at a wireless hot spot where connectivity problems can be particularly frustrating for users.

Figure 1:
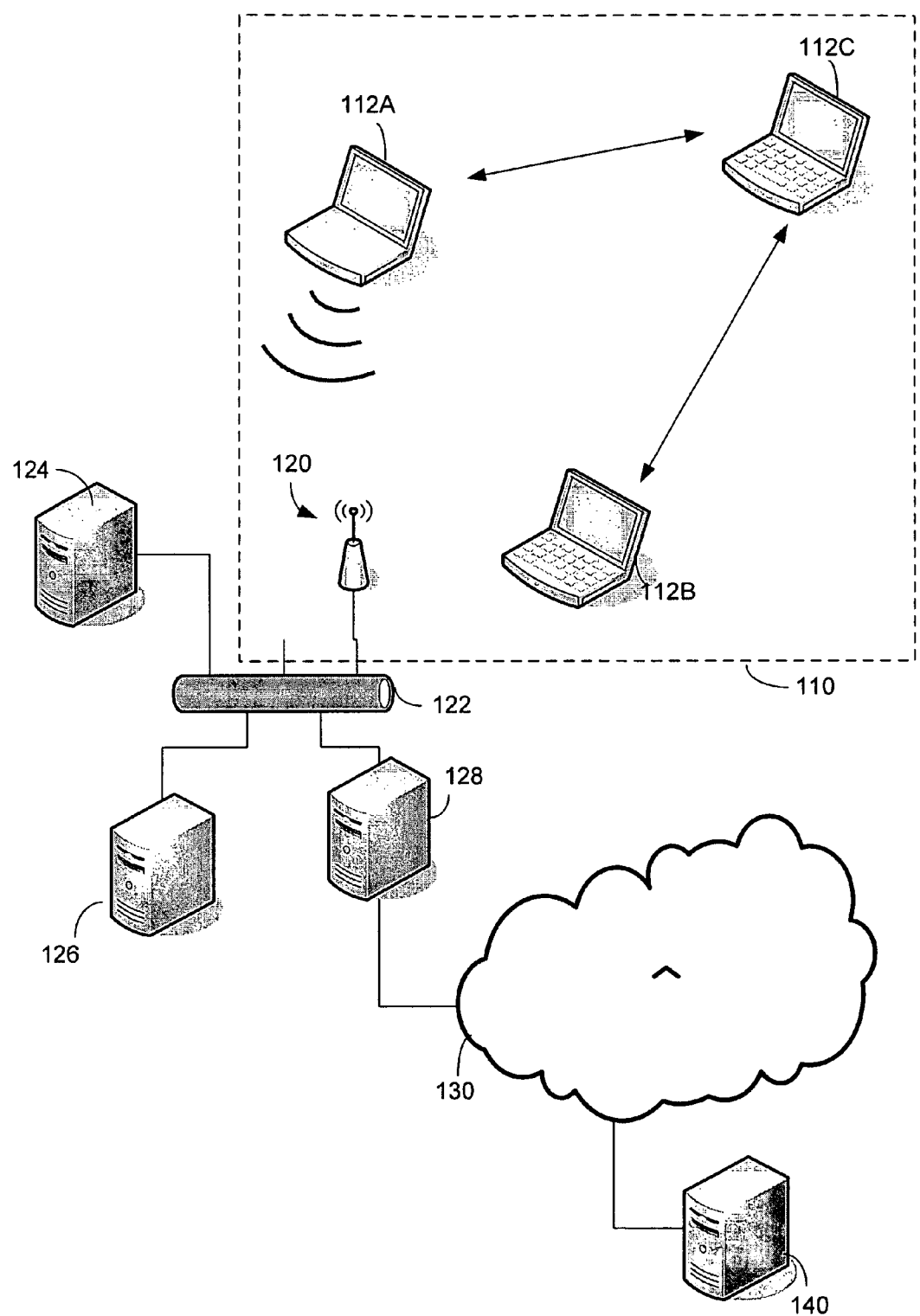
FIG. 1 is a sketch of a network including a wireless hot spot at which an embodiment of the invention is employed.

FIG. 1 is a sketch illustrating a network according to an embodiment of the invention. The network of FIG. 1 includes a wireless hot spot 110. Wireless hot spot 110 may exist in any physical location, such as an airport, a train station or a coffee shop. Wireless hot spot 110 exists around a wireless access point 120.

Computer users may bring portable computers 112A, 112B and 112C to wireless hot spot 110 and attempt to connect to a network through wireless access point 120. In this example, portable computers 112A, 112B and 112C are illustrated as laptop computers. However, any suitable computer may serve as a host for access to a network through wireless access point 120 and it is not necessary that all hosts be of the same form. For example, a pocket computer, smartphone or personal digital assistant (PDA) may serve as a host.

Wireless access point 120 forms a portion of a local area network 122. Hosts within wireless hot spot 110 may connect through wireless access point 120 to local area network 122. Accordingly, local area network 122 may include one or more devices that provide services to hosts within wireless hot spot 110. In the pictured example, a DHCP server 124 is shown to be connected to local area network 122. DHCP server 124 may be a DHCP server as used in a conventional local area network. The function of DHCP server 124 is to provide IP addresses to hosts connecting to local area network 122.

Local area network 122 also includes local DNS server 126. Local DNS server 126 may be a DNS server as used in a conventional network. As devices connected to local area network 122 seek to access devices by domain name, local DNS server 126 resolves domain names identifying remote hosts connected to wide area network 130 to specific network addresses. Local DNS server 126 therefore allows hosts at wireless hot spot 110 to access remote hosts.

Local area network 122 may also include a web proxy server 128. Web proxy server 128 provides a connection to wide area network 130, which may in many embodiments be the Internet. Web proxy server 128 may be a proxy server as used in a conventional network.

Wireless access point 120, DHCP server 124, local DNS server 126 and web proxy server 128 cooperate to allow a host at wireless hot spot 110 to have network access. For example, host 112A may connect through local area network 122 to wide area network 130 so that host 112A may access remote server 140.

The path from host 112A to remote server 140 contains many elements. A problem at any part of that path may cause the user of host 112A to have a negative experience as the user attempts to perform a function with host 112A that requires access to remote server 140. Unfortunately, the user may not be able to identify the source of such a problem and therefore may be unable to correct it. For example, a hardware problem within host 112A may prevent network access. Alternatively, problems with the wireless link between host 112A and wireless access point 120 may similarly prevent network access. Network access may also be disrupted by a problem within wireless access point 120 or any of the servers on local area network 122 that provide information necessary for communication between host 112A and remote server 140. These problems may be defects in the hardware or software of devices, such as DHCP server 124, local DNS server 126 or web proxy server 128. As an example, DHCP server 124 may require host 112A to use an IP address obtained from DHCP server 124, but the server may be down or out of IP addresses. Furthermore, problems within wide area network 130 or even within remote server 140 may preclude host 112A from accessing remote server 140.

These problems can lead to user frustration and other undesirable consequences. To prevent such undesirable consequences, a system to diagnose network access problems may be used. The system may report a diagnosis to a human user of a host seeking network access so that the user may resolve the problem. Alternatively, the system may automatically take corrective action to resolve detected problems. As described in greater detail below, some or all of the hosts within wireless hot spot 110 may be equipped with software that facilitates diagnosis, and possibly correction, of problems with network access experienced by a host.

An example embodiment of a system incorporating such software is described below in the context of the network pictured in FIG. 1. However, the network of FIG. 1 provides just one example of the type of network in which the invention may be used. For example, FIG. 1 shows physically separate hardware units for DHCP server 124, local DNS server 126 and web proxy server 128. Some or all of the functions performed by these devices may be performed within the same physical hardware. Furthermore, wireless access point 120 may be implemented in the same hardware as DHCP server 124, local DNS server 126 or web proxy server 128. Multiple other variations are likewise possible. For example, local area network 122 is illustrated with wired connections between devices. The same functionality may be achieved with wireless or other types of connections between devices in local area network 122.

Regardless of the specific implementation of the network in which a diagnostic system is used, the diagnostic system may be implemented by changes to communication software within each host seeking network access at wireless hot spot 110. In some embodiments, the software making up the diagnostic system will be implemented as a portion of the operating system of each of the hosts 112A, 112B and 112C. However, any suitable implementation, including implementation in hardware, may be used.

In the pictured embodiment, each host within wireless hot spot 110 includes an interface through which software on the host may send and receive information for wireless communication with access point 120. Such an interface may be a wireless network adapter as is used in a conventional portable computer. This interface may be a primary network adapter that is used for normal network communication when the host is not operating in diagnostic mode.

Additionally, each of the hosts within wireless hot spot 110 may include a second interface through which it can send and receive information for wireless communication with other nearby hosts. Such an interface may also be implemented as a wireless network adapter described herein as a "helper adapter." The helper adapter may be of the same form as a wireless network adapter in a conventional computer, but may be active only for a host operating in a diagnostic mode. The primary and helper adapters may, in some embodiments, control separate radios within the host. However, in some embodiments, a host may have a single radio and each of the primary and helper adapters may be virtual adapters. Software within the host may interface both the primary adapter and the helper adapter to a single radio, while allowing each adapter to operate as if it had sole control over that radio. Such virtual adapters are known and used in other contexts and may be implemented using conventional programming techniques.

Regardless of the specific implementation of the primary adapter and helper adapter, providing two interfaces for wireless communication allows for each host to communicate either with wireless access point 120 or other hosts in its vicinity. As a result, a host at wireless hot spot 110 may communicate with other hosts at wireless hot spot 110. Host-to-host communication may be used to request and receive status information.

This status information may then be used to diagnose connectivity problems. For example, FIG. 1 shows host 112A communicating wirelessly through wireless access point 120. Host 112B is shown to be located at wireless hot spot 110 but is not communicating with wireless access point 120. Host 112C in this embodiment represents a portable computer experiencing connectivity problems. Host 112C communicates with host 112A and 112B to obtain status information about their network access and settings. As described in more detail below, host 112C uses the status information, in conjunction with information it obtains on its own status, to diagnose its connectivity problem.

Figure 2:
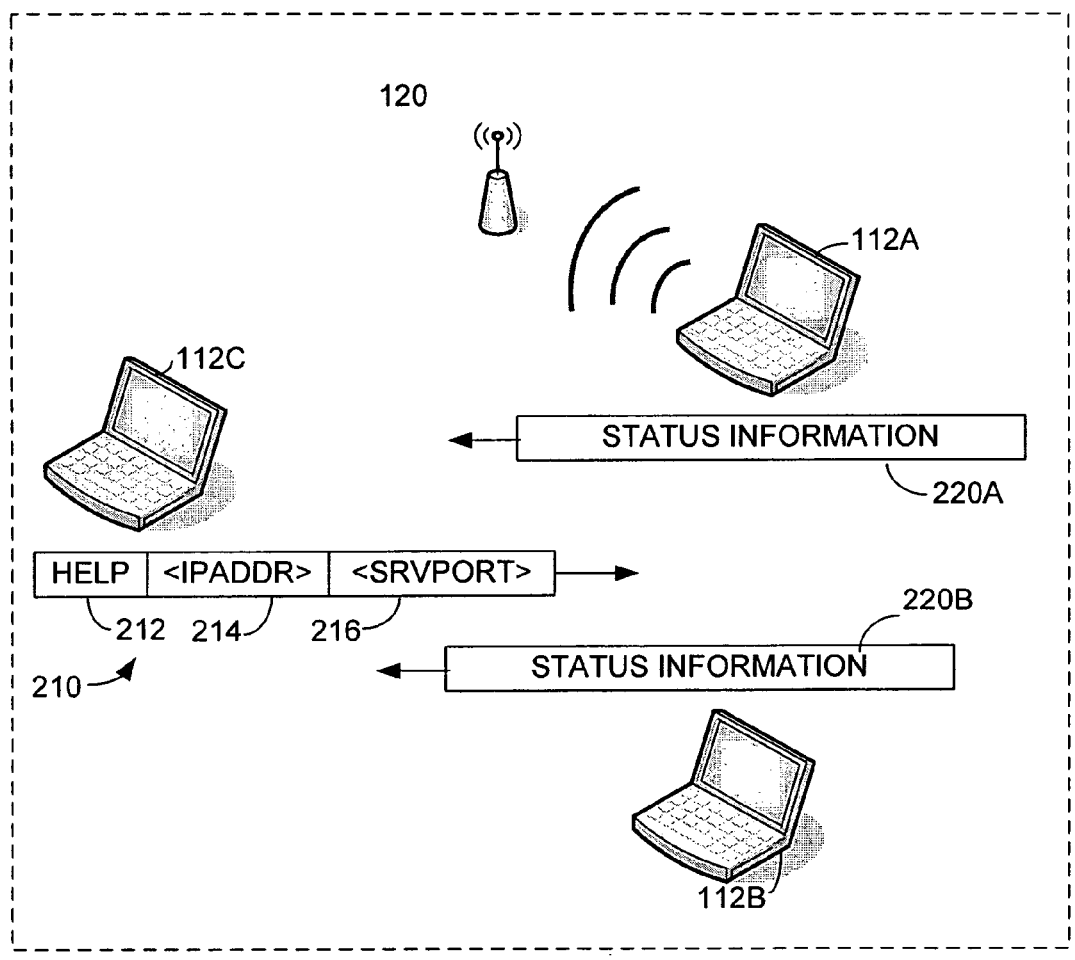
FIG. 2 is a sketch illustrating interaction between host computers at the wireless hot spot of FIG. 1.

FIG. 2 illustrates an exchange of information between hosts in greater detail. Any suitable protocol may be used for communication between hosts. Here, communication in the UDP protocol is illustrated. Each communication is in the form of a packet of a size prescribed by the protocol.

Communication between hosts may be initiated by one of the hosts, described herein as a requesting host, sending a request for information. The request may be in a form used to establish a connection in a conventional ad hoc network, but any suitable form of request may be used. In this example, request 210 is formatted as an SSID according to IEEE 802.11 because the SSID will be available to any node that receives beacons for the ad hoc network. Request 210 is here shown with three fields. Field 212 contains a code identifying that request 210 is a request for diagnostic information. Field 214 contains an IP address that the requesting host is monitoring. Similarly, field 216 identifies a port that the requesting host is monitoring. Request 210 may be transmitted by requesting host 112C and received by nearby hosts.

A host receiving request 210 may generate a response, such as response 220B generated by host 112B or response 220A generated by host 112A. Each of the responses 220A and 220B may be in the form of a UDP or TCP packet. The packet may contain status information about the host generating the response, herein described as a "responding host." In an embodiment in which each of the responses 220A and 220B is formatted according to UDP, the response may contain up to 1,200 bytes of information. However, any suitable format for a response may be used.

In some embodiments, it may be desirable to reduce the impact that supplying status information has on a responding host, which is likely being used for other purposes. Accordingly, hosts may be programmed so that multiple responding hosts do not simultaneously respond to request 210. Each host may be programmed to wait for a period of time before responding to request 210. When a requesting host receives a sufficient number of responses, it may terminate the ad hoc network which in effect terminates the request for help transmissions. Nodes that are still waiting to respond will then not respond, thereby sparing themselves the overhead incurred when responding.

FIG. 2 shows a simple exchange of messages allowing host 112C to collect status information. Exchanges of information in other formats may alternatively be used. For example, host 112B is shown in a state in which it is not actively communicating with wireless access point 120. If host 112B has previously experienced connection problems, host 112B may have already gathered status information from other hosts at wireless hot spot 110. Accordingly, host 112B may respond to request 210 with status information about itself and about other hosts for which it has previously collected information. In this way, host 112C may collect status information without imposing a computational burden on a host, such as host 112A, that is actively being used for communication through wireless access point 120. To facilitate an exchange of information in this format, each host may be programmed such that hosts that have recently collected status information respond first to request 210. Hosts that are actively communicating through wireless access point 120 or are otherwise performing functions for their users may not respond to request 210 may wait a longer period before responding. Host 112C may repeat the request only if it does not receive sufficient status information from host 112B. In this format, host 112C will receive information from host 112A, if necessary for diagnosis of network access problems, but host 112A will not be burdened providing the information if host 112C can obtain the information in a different way.

Figure 3:
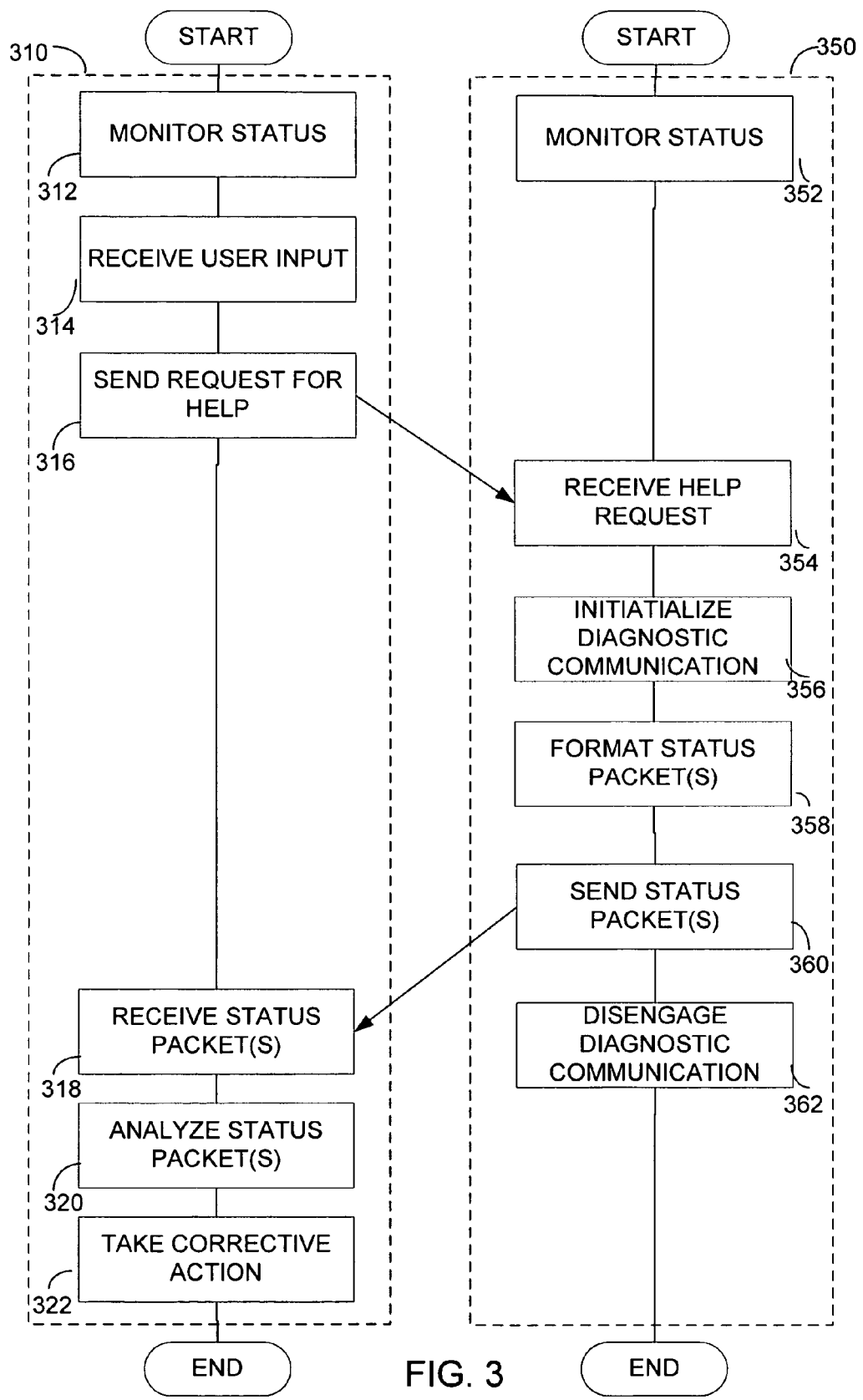
FIG. 3 is a flowchart illustrating interaction between two host computers of FIG. 2.

The process of sharing status information among hosts is further described in connection with FIG. 3. FIG. 3 shows a flow chart of a process by which wireless hosts may operate. Subprocess 310 is performed within a requesting host. Subprocess 350 is performed within a responding host. As described in connection with FIG. 2, multiple hosts may respond to a request for information. Though processing within a single responding host is shown, other hosts may respond according to the subprocess 350.

The processing shown in FIG. 3 may be controlled by software within the operating systems of host computers. For example, in some embodiments, the processing is controlled by a modified network stack. However, the processing of FIG. 3 may be performed in any suitable way.

Subprocess 310 begins at block 312. At block 312, the requesting host monitors its own network access status. Monitoring performed at block 312 may be performed as in conventional communication software or hardware or may involve capturing information generated as part of normal network communication. However, in some embodiments, status monitoring performed at block 312 may require generation of information not traditionally generated in conventional communication hardware or software.

Status information may be captured or generated by one or more software components that interact with communication hardware and software and act as "sensors." For example, a conventional wireless network interface card may monitor received signal strength. Processing at block 312 may be performed by a sensor that stores received signal strength measurements made by the wireless network interface card. Similarly, a sensor may obtain status information by interacting with a network adaptor that identifies that it has requested an IP address but has not received one.

In some instances, monitoring performed at block 312 does not require storage of information separate from that which occurs as part of the operation of conventional communication hardware or software. However, in other instances, monitoring performed at block 312 may involve additional storage of information. For example, status information obtained at block 312 may include average values of parameters whereas conventional communication software and hardware may store only instantaneous values. In those circumstances, a sensor may periodically obtain values generated by the conventional communication software or hardware and then may compute and store an average value.

Any desired status information may be stored at block 312. In the described embodiment, the information stored at block 312 may also relate to the characteristics of the communication path between a host in wireless hotspot 110 and remote servers, such as remote server 140. However, more or less information may be stored, depending on the types of problem to be identified by a diagnostic system or other factors.

Subprocess 310 continues to block 314. At block 314, user input is provided to trigger diagnosis of a network access problem. Diagnosis could be performed automatically without the requirement of user input, in which case block 314 may be omitted. However, requiring user input as a trigger for the diagnostic processing may reduce the number of requests each host generates to other hosts at wireless hotspot 110 and therefore reduce the overall load on responding hosts.

User input may be received at block 314 in any suitable format. In some embodiments, a host may be programmed to present a user interface through which a user may invoke a "help" tool. A user may provide the input at block 314 by accessing this tool. User input received at block 314 may, in some embodiments, be simply a command to initiate diagnostic processing. In other embodiments, user input received at block 314 may provide additional status information useful in diagnostic processing. For example, a user may provide input specifying whether other hosts are present at the wireless hotspot or describing the nature of the access problem. If user input received at block 314 does not specify a problem, an access problem may be identified from status information stored at block 314 or in any other suitable way.

Regardless of how the diagnostic process is triggered, processing proceeds to block 316. At block 316, communication software within the host experiencing a network access problem sends a request for help. The request sent at block 316 may be in the form of request 210 (FIG. 2). In some embodiments, diagnostic communications between hosts are sent through an ad hoc network established between hosts. A requesting host may initiate such an ad hoc network using its helper network adapter. Accordingly, some part of the processing at block 316 may include establishing the ad hoc network or activating the helper network adapter (whether a separate physical adapter or a virtual adapter). However, any suitable request for help may be sent.

The request for help transmitted at block 316 triggers action within subprocess 350. In embodiments described above, each host includes a primary adapter and a helper adapter. Either adapter may be used to receive the request for help at block 354. In the pictured embodiment, the primary adapter, though predominantly intended for communication with a wireless access point may also monitor for requests for status information. To minimize power consumption, the helper adapter may be activated only if such a request is received.

Subprocess 350 is performed in a responding host at wireless hotspot 110. As shown in FIG. 3, subprocess 350 includes block 352 at which the network access status of the responding host is monitored. Processing at block 352 may be the same at that performed at block 312, described above. In the pictured embodiment, each host may be programmed with the same diagnostic software. Accordingly, each host may monitor its status so that status information is available for use in diagnosing its own network access problem or is available to provide to other hosts requesting help diagnosing their network access problems.

Accordingly, when a request for help is sent by a requesting host at block 316, a responding host on which subprocess 350 is performed may receive that request and may already have status information gathered by the processing at block 352. When the responding host on which subprocess 350 executes receives the request transmitted at block 316, processing within subprocess 350 may proceed to block 354 without delay caused by gathering of status information.

Processing then proceeds to block 356 where a diagnostic communication link is established between the requesting host and the responding host. As described above, any suitable means of establishing a diagnostic communication link may be used. For example, the diagnostic communication link may be established over the Access Point network if the requesting host is also connected and facing performance problems. An ad hoc network may be formed between the requesting host and responding hosts if the requesting host is unable to communicate with a sufficient number of responding hosts over the Access Point network. This ad hoc network is formed using a helper network adapter separate from the primary network adapter used for communication with the wireless access point. The helper network adapter may normally be disabled or otherwise operated in a state to reduce power consumption within the host. Accordingly, when a request for help is received at block 354, the helper adapter and any other components used for communication of diagnostic information may be enabled and initialized at block 356, if needed.

Processing then proceeds to block 358 where status information stored at block 352 is formed into a packet. Any suitable format may be used to transmit status information. In the described embodiment, status information is formatted as a UDP packet with specific fields defined to hold specific types of information. In some instances, information included in the packet formed at block 358 may be encrypted. For example, it may be desirable for a responding host to provide information about an access code or other security information that the responding host uses to perform a network function, such as associating with an access point. However, providing the security information directly would compromise the security information. In some embodiments, security information is obfuscated at block 358 using a one-way hash or other suitable algorithm. Information obfuscated using a one-way hash may not be decrypted by the requesting host. However, the requesting host may apply the same one-way hash to its security information and compare the result. In this way, the requesting host may determine whether it is using the same security information as the responding host.

Regardless of the specific format of the packets formed at block 358, processing proceeds to block 360 where the packets are transmitted. In the described embodiment, the packets are transmitted through the helper adapter in the responding host, but any suitable means of processing may be used.

Any number of packets may be transmitted at block 360. In the described embodiment, each responding host generates status information that fits within one UDP packet. In such an embodiment, a single packet may be transmitted at block 360. However, even when status information from a single responding host fits within a single packet, multiple packets may nonetheless be transmitted at block 360. For example, embodiments of the diagnostic system may be constructed in which each responding host responds to a request for information with a packet containing its own status information and additional packets containing any other status information the responding host may have recently collected from other hosts. For example, if the responding host has previously requested and received status information from other hosts, the information previously received from other hosts may also be transmitted at block 360.

Once the status information is transmitted at block 360, subprocess 350 proceeds to block 362. At block 362, the responding host disengages the diagnostic communication link initialized at block 356. As described above, each host maintains separate communication interfaces for communication with a wireless access point and communication with other hosts as part of the diagnostic system. The interface for diagnostic communication may be operated in a low-power state except when status information is actively being exchanged for diagnostic purposes. Accordingly, it may be desirable to disengage diagnostic communication link at block 362 by disabling a helper adapter or other suitable steps. In the described embodiment, even though the diagnostic communication link is disengaged, each host may nonetheless monitor wireless transmissions so that requests for help are detected.

Subprocess 310 resumes at block 318 following transmission of status packets at block 360. At block 318, the requesting host receives the status packets transmitted by one or more responding hosts. In the described embodiment status packets are received through a helper adapter. However, status packets may be received in any suitable way.

Regardless of the manner in which status packets are received, processing proceeds to block 320. At block 320, the requesting host analyzes the received status packets in conjunction with status information collected for the requesting host. Any suitable processing may be performed on the status information to identify either the existence or source of network access problems. Examples of processing that may be performed are provided in conjunction with FIGS. 4A through 4E, below. Each of these figures shows processing performed when the requesting host has experienced specific symptoms. The symptoms may be identified from status information collected by the requesting host, from user input or in any other suitable way.

Following the analysis at block 320, corrective action may be taken at block 322. In some embodiments, corrective performed at block 322 may involve adjusting communication settings or other parameters affecting the operation of the requesting host. These adjustments may be made without user interaction. However, in some instances, corrective action will require user involvement. In those instances, corrective action taken at block 322 may involve presenting information through a user interface on the requesting host describing to a user how to correct any network access problems identified at block 320. In other embodiments, corrective action at block 322 may simply involve reporting the results of the analysis performed at block 320 to a human user. Accordingly, any suitable method of taking correction may be performed at block 322.

Figure 4A:
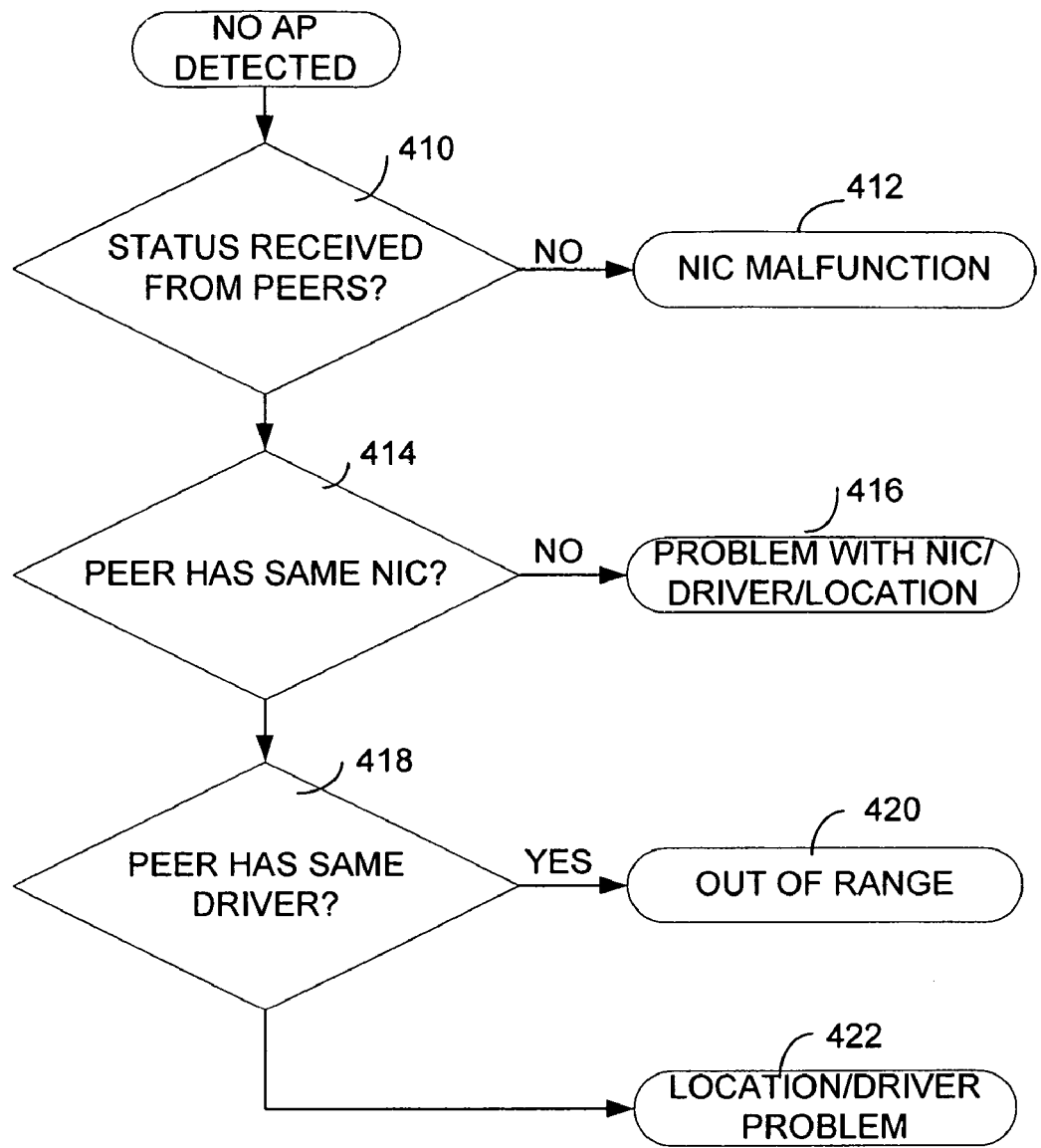
FIG. 4A is a flowchart of processing according to an embodiment of the invention performed by a host that cannot detect an access point.

As described above, analysis performed on the status information may be selected based on problem symptoms experienced by the requesting host. FIG. 4A is a flowchart of diagnostic processing that may be performed at block 320 when a requesting host is unable to detect a wireless access point. The process of FIG. 4A begins at decision block 410. At decision block 410, the process branches depending on whether the requesting host received status packets from responding hosts at block 318 (FIG. 3). If the requesting host is unable to communicate with either a wireless access point or another host although it is physically close to other wireless hosts, the network access problem experienced by the requesting host is likely the result of a malfunction in a wireless network interface card within the requesting host. Accordingly, the process branches to termination point 412. Termination point 412 indicates that a problem, specifically a network interface card malfunction, has been identified.

Conversely, if status packets have been received from other hosts, processing proceeds to decision block 414. At block 414, the process branches depending on whether any of the responding hosts that receive a beacon has the same type of NIC. If none of the hosts that receive a beacon from a wireless access point has the same type of NIC, it is likely either the client's NIC type, its wireless driver, or its location is the cause of the problem. Accordingly, the process branches to termination point 416. If the process reaches termination point 416, a problem with NIC, wireless driver or location has been identified.

However, if at least one of the responding hosts with the same type of NIC has received a beacon from an access point, processing proceeds to decision block 418. At decision block 418, the process branches depending on whether the responding hosts that have received beacons from the access point have the same type of driver software as the requesting host. If the peer that can communicate with the access point and the requesting host have the same type of driver software, the network access problem is likely caused by the requesting host being too far from the access point to reliably receive a signal. Accordingly, in that scenario the process branches to termination point 420 where the network access problem is identified to be that the requesting host is out of range of the access point.

Conversely, if the responding hosts that can communicate with the wireless access point have a different type of driver than the requesting host, then the network access problem is likely caused by a problem with the location or driver software in the requesting host. Accordingly, the process branches to termination point 422 where that problem is identified.

Termination points 412, 416, 420 and 422 all indicate that causes of a network access problem have been identified. The specific causes of the problem identified at those termination points may not be corrected by merely reconfiguring software or hardware within the requesting host. Accordingly, corrective action taken in response to identification of such a problem may be to simply notify the user of the requesting host. For example, a user of a requesting host that is out of range may address the problem by moving closer to the wireless access point. However, it is unlikely that a user will be able to repair a network interface card malfunction or a malfunction with the wireless access point. Nonetheless, being informed of the nature of a network access problem may be an advantage to the user. A user who is aware that the network access problem is outside of his control may spend less time attempting to correct the problem and may be less frustrated. Accordingly, providing a user with diagnostic information of the type depicted in FIG. 4A may still improve the overall user experience.

Figure 4B:
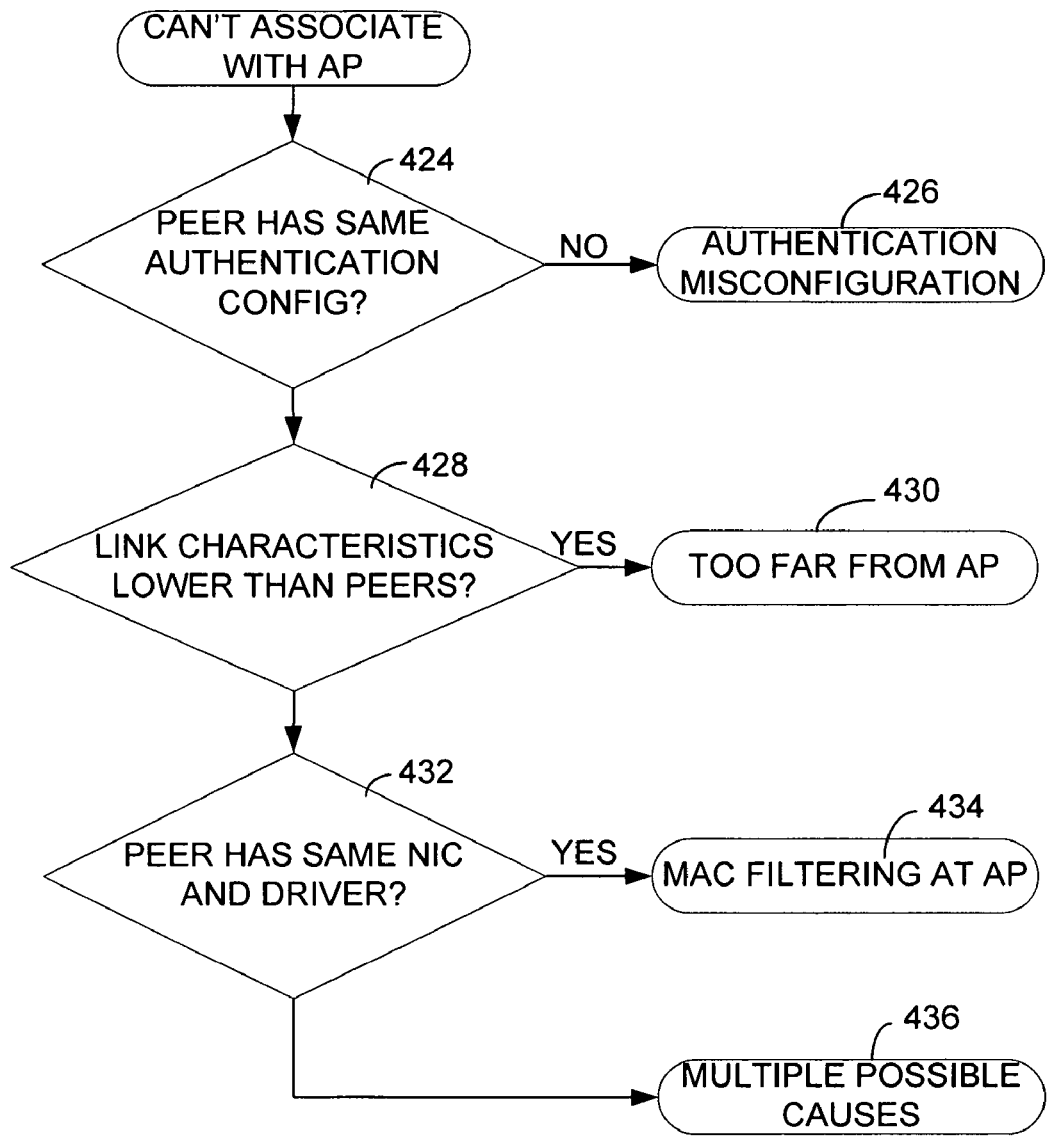
FIG. 4B is a flowchart of processing according to an embodiment of the invention performed by a host that cannot associate with an access point.

FIG. 4B is a flowchart of processing that may be performed within block 320 (FIG. 3) when the requesting host is unable to associate with the wireless access point. When such a condition is detected, processing may begin at decision block 424. At decision block 424, the process branches based on whether any responding hosts have successfully associated with the wireless access point. If any responding hosts have associated with the wireless access point, authentication information from those hosts is compared with similar authentication information from the requesting host. For example, some wireless access points employ wired equivalent privacy (WEP), which requires a key. Other access points may employ WiFi protected access (WPA or WPA2) which may require a master key or pre-shared key. Other authentication mechanisms require pass codes. Regardless of the specific authentication mechanism employed by the wireless access point, status information provided by a responding host may identify the type of authentication it used and may include an encrypted version of a key or pass code used to gain access according to that authentication mechanism. If the requesting host does not use the same authentication mechanism and does not have the same key or pass code, the network access problem is most likely caused by the requesting host being improperly configured to authenticate with the wireless access point. Accordingly, the process branches to termination point 426 where that cause of the problem is identified.

Alternatively, if responding hosts that can associate with the wireless access point have the same authentication configuration as the requesting host, processing proceeds to decision block 428. At decision block 428, the process branches based on a comparison of link characteristics of the requesting host to comparable link characteristics of responding hosts that can associate with the access point. Any suitable link characteristics may be used for the comparison at decision block 428. For example, the beacon loss rate between the access point and the host may be used as one link characteristic. Beacon lost rate is sometimes collected by network interface cards. However, other link characteristics may be examined to determine whether information is reliably passing between the requesting host and the wireless access point. For example, received signal strength is often measured by wireless network interface cards and alternatively or additionally may be examined at decision block 428.

Regardless of the specific link characteristics examined at decision block 428, if the requesting host has link characteristics indicating significantly less reliable transmission of information than other hosts that can reliably associate with the wireless access point, the likely source of the problem is that the requesting host is too far from the wireless access point for reliable communication. Accordingly, the process branches to termination point 430 where distance between the requesting host and the wireless access point is identified as a cause of the network access problem.

Alternatively, if the requesting host has link characteristics that are comparable or better than link characteristics of other responding hosts that can associate with the wireless access point, the process continues to decision block 432. At decision block 432, the type of network interface card and driver software in the requesting host are compared to those in responding hosts that can associate with the wireless access point. If these hosts have the same type of network interface card and driver software, processing proceeds to termination point 434. By the time processing reaches termination point 434, other possible causes of problems associating with wireless access point have been ruled out. Accordingly, the likely cause of the network access problem is identified as MAC filtering at the access point that is precluding the requesting host from associating with the wireless access point.

Conversely, if the requesting host does not have the same type of network interface card and driver software as other responding hosts that can associate with the wireless access point, processing proceeds to termination point 436. If the processing reaches termination point 436, no specific source of a network access problem has been identified. The network access problem may be the result of an incompatible type of network interface card, an incompatible wireless driver for the network interface card or MAC filtering at the wireless access point.

Figure 4C:
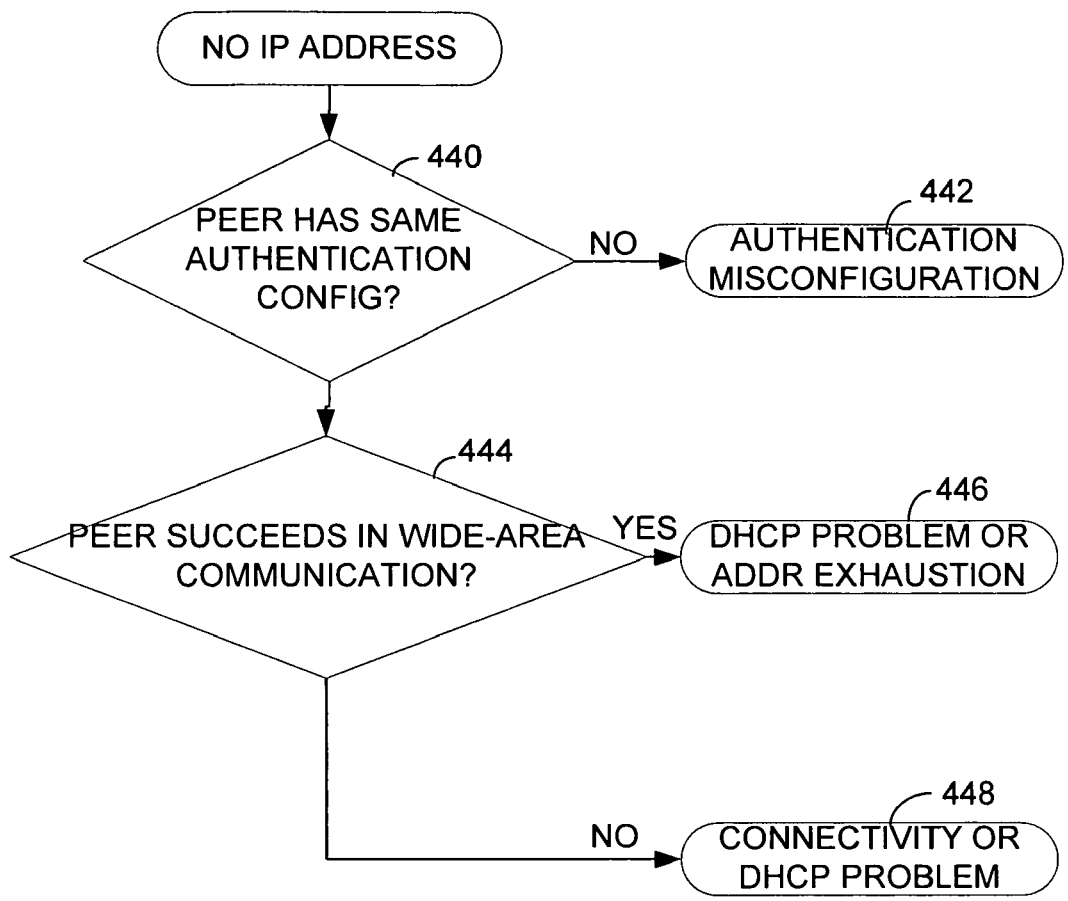
FIG. 4C is a flowchart of processing according to an embodiment of the invention performed by a host that cannot obtain an IP address.

Turning now to FIG. 4C, a flowchart of the process that may be performed when the requesting host is unable to obtain an IP address is pictured. The processing of FIG. 4 begins at decision block 440. At decision block 440, the process branches based on whether a responding host has the same authentication configuration as the requesting host. Processing at decision block 440 may be similar to that performed at decision block 442. If the authentication configuration does not match, the process branches to termination point 442 where an authentication misconfiguration is identified as the source of the problem.

Conversely, if the requesting host has the same authentication configuration as a responding host that was able to obtain an IP address, the process continues to decision block 444. If any host succeeds in wide-area communication, the process branches to termination point 446. If processing reaches termination point 446, a responding host is able to perform wide-area communication, which rules out general connectivity proglem. The likely cause of the network access problem experienced by the requesting host is a problem within the DHCP server or IP address exhaustion. If processing reaches termination point 446, a problem with the DHCP server or IP address exhaustion is indicated as the source of the problem.

Conversely, if none of the hosts successfully performed wide-area connection recently, the likely source of the problem is either general connectivity problems or DHCP server problems. In this scenario, the process branches from decision block 444 to termination point 448. If the process reaches termination point 448, general connectivity problem or DHCP server problem is indicated as the source of the network access problem.

Figure 4D:
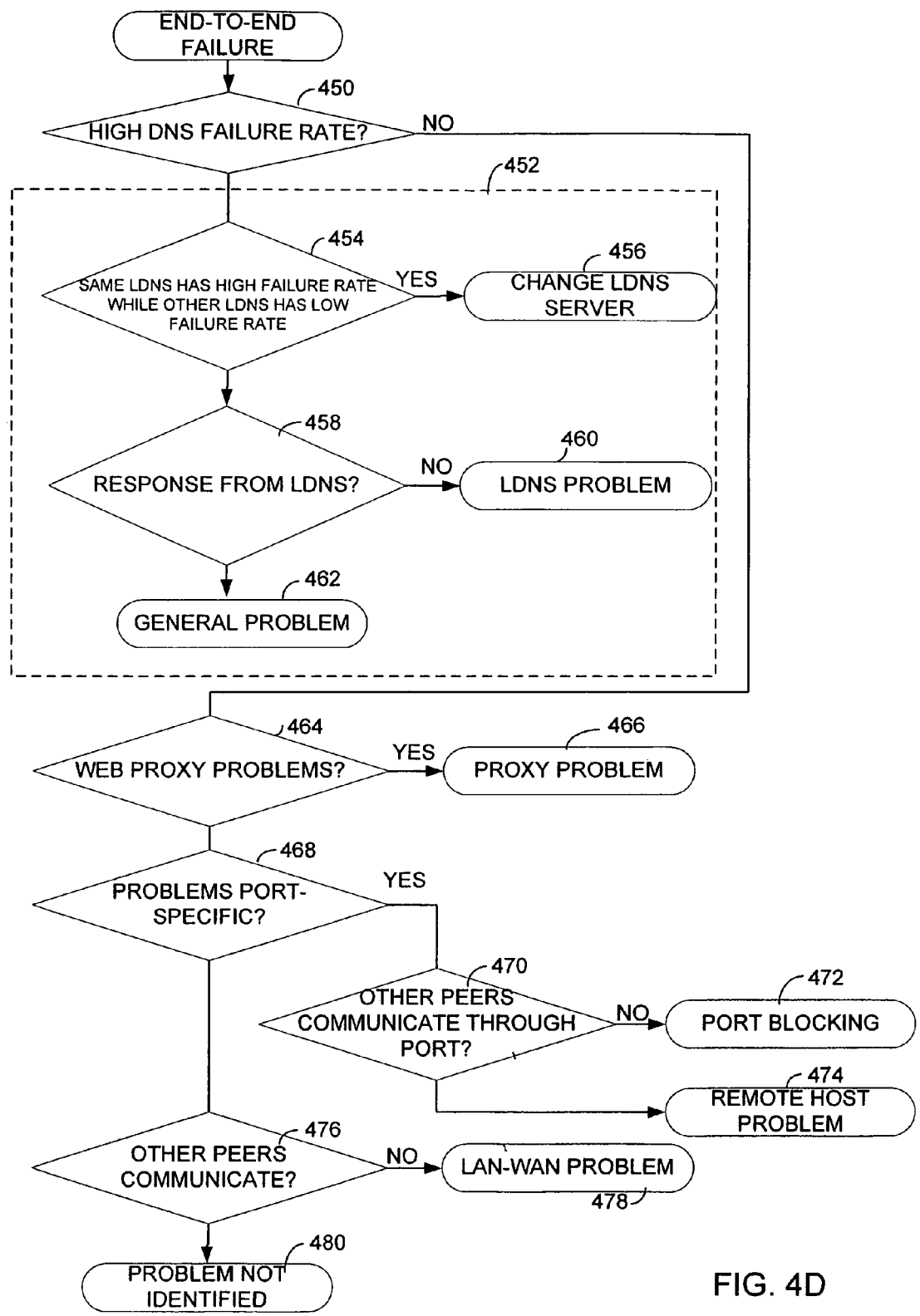
FIG. 4D is a flowchart of processing according to an embodiment of the invention performed by a host experiencing a problem communicating with a remote host.

FIG. 4D shows a flowchart of a process that may be performed when an end-to-end communication failure is detected. An end-to-end communication failure may occur, for example, when a requesting host is unable to access a remote server. The process of FIG. 4D begins at decision block 450. At decision block 450, the DNS failure rate of the requesting host is compared with a threshold. The threshold may be a predetermined threshold or may be computed dynamically based on DNS failure rates measured in either the requesting host or the responding hosts. However, regardless of the specific method by which a DNS failure rate is classified as "high," if the requesting host has a high DNS failure rate, subprocess 452 is performed.

During subprocess 452, further analysis is performed to identify a reason why the local DNS is unable to reliably resolve an address for a remote server. Subprocess 452 begins at decision block 454. At decision block 454, status information from responding hosts is examined to determine whether a responding host with DNS settings different from the requesting host was able to connect without a high DNS failure rate. If at least one host is able to connect without a high DNS failure rate, the likely cause of the problem is that the LDNS setting is wrong. Accordingly, the process branches termination point 456 where the LDNS setting is identified as the source of the problem.

Conversely, if all other peers experience high DNS failure rate, processing proceeds to decision block 458. At decision block 458, status information from responding hosts is again examined. If no peer receives response from LDNS servers, it is likely that the LDNS server is down. Accordingly, the process branches to block 460 where the LDNS server is identified as the source of the network access problem. However, if some peers receive response from LDNS servers, it is likely that a general DNS problem is causing the network access problem.

Alternatively, when end-to-end failure is detected without a high DNS failure rate, processing branches from decision block 450 to decision block 464. At decision block 464, status information is analyzed to determine whether a network access problem is caused by incorrect web proxy settings. The processing performed at decision block 464 may be similar to that performed in subprocess 452. For example, status information from responding hosts may be examined to determine whether any responding host had a low web proxy failure rate and if the responding hosts with low web proxy failure rates had web proxy settings similar to those used by the requesting host.

Regardless of the specific processing performed at decision block 464, if the processing identifies a web proxy problem, the process branches to termination point 466 where a web proxy problem is identified. As with the processing of subprocess 452, the web proxy problem may be an unreachable web proxy server or a general web proxy problem. If the processing at decision block 464 determines that the web proxy problem is caused by misconfiguration in the requesting host, web proxy settings in the requesting host may be automatically reconfigured.

If the problem is not identified following processing at decision block 464, the process continues to decision block 468. At block 468, status information from the requesting host is examined to identify whether network access problems occur consistently for transmissions through a specific port. If so, the process branches to decision block 470. At decision block 470, status information from responding hosts is analyzed to identify whether any of the responding hosts may communicate through the problem port. If none of the responding hosts may communicate through the problem port, the likely source of the network access problem is a firewall setting at the access point that blocks communication through the problem port. Accordingly, the process branches to termination point 472 where the network access problem is identified as being caused by the setting of the access point firewall.

If responding hosts can communicate through the problem port, the network access problem is likely caused by a problem accessing the remote host being accessed by the requesting host. Accordingly, the process branches to termination point 474 where the network access problem is identified as being caused by a problem accessing the remote host.

Conversely, if processing at decision block 468 does not identify a port-specific problem, processing proceeds to decision block 476. At decision block 476, status information from the responding hosts is examined to identify whether other hosts may communicate with other remote hosts. If no responding hosts can communicate with a remote host, the network access problem is likely caused by a general problem within the local area network (122, FIG. 1) or wide area network (130, FIG. 1). Accordingly, in this circumstance, processing branches from decision block 476 to termination point 478 where a general problem with the local area network or wide area network is identified as the source of the network access problem.

Conversely, if some of the responding hosts are able to communicate with remote hosts, processing branches from decision block 476 to termination point 480. If processing reaches termination point 480, no specific problem has been identified.

Figure 4E:
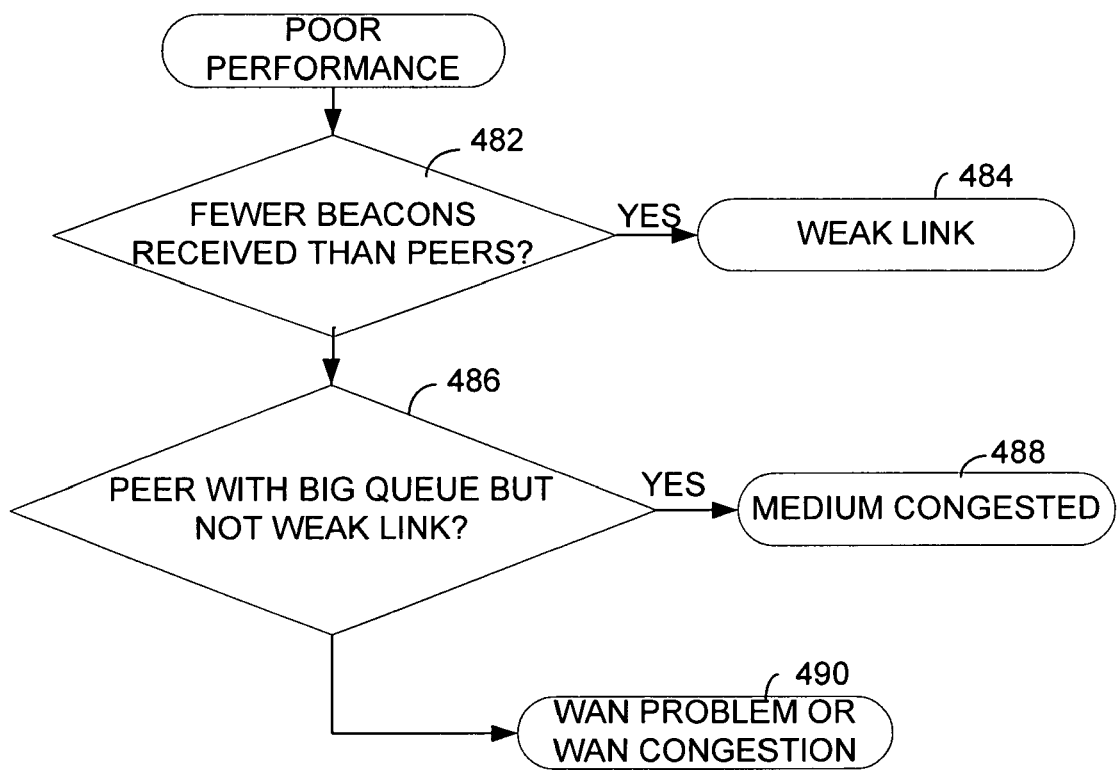
FIG. 4E is a flowchart of processing according to an embodiment of the invention performed by a host experiencing poor network performance.

Other processing may be performed in response to yet other symptoms of a network access problem. FIG. 4E pictures processing that may be performed when the requesting host is able to access the network, but only with poor performance. When the requesting host experiences poor performance, processing begins at decision block 482.

At decision block 482, the loss rate of information associated with the requesting host is compared to the loss rate of information associated with responding hosts. Loss rate of information may be determined in any suitable way. For example, a wireless access point may transmit periodic beacons that allow hosts to identify the wireless access point. In some embodiments, a host may monitor beacons received from the wireless access point. A host may track the periodicity of beacons transmitted by an access point and identify when beacons are missed. Accordingly, a host may compute its beacon loss rate. However, in some embodiments, similar information may be obtained in other ways. For example, the number of beacons received at the requesting host in comparison to number of beacons received at responding hosts may be an indication of the loss rate of information transmitted to the requesting host. Loss characteristics may be computed using any signal, including signals transmitted by the individual hosts. Regardless of the specific signals analyzed at decision block 482 to identify whether the requesting host is experiencing high loss in communications, the cause of the problem is likely a weak wireless link been the requesting host and the wireless access point. Accordingly, processing branches to termination point 484 where a weak link is identified as the source of the network access problem.

Conversely, if processing at decision block 482 does not identify a weak link as the source of the problem, processing proceeds to decision block 486. At decision block 486, status information received from responding hosts is analyzed to identify whether any of the responding hosts has a large transmit queue but does not have a weak link. If some of the hosts have large transmit queues but do not have weak links, it is likely that poor performance in the transmission of information is caused by congestion on the wireless link. Accordingly, processing branches to termination point 488 where congestion in the wireless medium is identified as the source of the network access problem.

Conversely, if congested medium is not identified as the source of the problem at decision block 486, the process branches to termination point 490. If the process reaches termination point 490, a WAN problem or congestion in WAN has been identified.

The foregoing processing is illustrative of processing that may be performed based on status information obtained from the requesting host and from other responding hosts. Though the processing steps may be performed in the order indicated, such an order is not required. Processing steps may be performed in parallel or in any other suitable ordering.

Having thus described several aspects of at least one embodiment of this invention, it is to be appreciated that various alterations, modifications, and improvements will readily occur to those skilled in the art.

For example, the invention is described for use at a wireless hotspot without a network administrator. However, the invention is equally applicable if there is an administrator because it can speed resolution of user problems or reduce demands on the administrator's time.

In addition, each host was described to communicate directly with other hosts. Host-to-host communications may occur indirectly, including through the access point.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used as merely labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer for use as a host on a wireless LAN, the wireless LAN having at least one access point, and the computer being a first computer comprising:
   a) at least one wireless communication interface;
   b) a computer-readable device having computer-executable instructions for performing steps comprising:
      i) detecting a connectivity problem based on the first computer being unable to communicate over the wireless LAN through the at least one access point;
      ii) in response to detecting that the first computer is unable to communicate over the wireless LAN through the at least one access point, automatically forming a request for diagnostic information and using the at least one wireless communication interface of the first computer unable to communicate over the wireless LAN to transmit the request for diagnostic information to at least one second computer acting as a host on the wireless LAN;
      iii) receiving, by the first computer unable to communicate over the wireless LAN, diagnostic information from the at least one second computer acting as a host on the wireless LAN, wherein the diagnostic information is transmitted by the at least one second computer in response to the request transmitted by the first computer and is received by the first computer via the at least one wireless communication interface, and wherein the diagnostic information comprises a configuration setting of the at least one second computer and/or an operating condition of the at least one second computer; and
      iv) diagnosing, by the first computer unable to communicate over the wireless LAN, the connectivity problem using the diagnostic information received from the at least one second computer via the at least one wireless communication interface.

2. The first computer of claim 1, wherein the computer-readable device has stored thereon a module comprising computer-executable instructions for implementing a network stack and the computer-executable instructions for performing the steps b(i)-(iii) are within the module.

3. The first computer of claim 1, additionally comprising a network interface card and wherein using the diagnostic information to diagnose the connectivity problem comprises indicating a problem with the network interface card when the first computer cannot detect the at least one access point and cannot exchange diagnostic information with any other computer acting as a host.

4. The first computer of claim 1, wherein using the diagnostic information to diagnose the connectivity problem comprises indicating that the first computer is out of range of the at least one access point when the first computer cannot detect the at least one access point and can receive diagnostic information with the at least one second computer acting as a host.

5. The first computer of claim 1, wherein using the diagnostic information to diagnose the connectivity problem comprises indicating that the first computer has a software problem when the first computer cannot detect the at least one access point but can receive diagnostic information from one or more other computers acting as hosts and the information received indicates that each of the one or more other computers has a different software version compared to the first computer.

6. The first computer of claim 1, wherein:
   i) the at least one wireless communication interface comprises a first interface for wireless communication and a second interface for wireless communication; and
   ii) the computer-executable instructions for performing steps comprising detecting that the first computer is unable to communicate over the wireless LAN through the at least one access point comprise computer-executable instructions for performing steps comprising attempting to use the first wireless communication interface to communicate over the wireless LAN through the at least one access point; and
   iii) the computer-executable instructions for performing steps comprising using the at least one wireless communication interface to receive diagnostic information from the at least one second computer acting as a host on the wireless LAN comprise computer-executable instructions for performing steps comprising using the second wireless communication interface to receive diagnostic information from the at least one second computer acting as a host on the wireless LAN, in response to detecting that the first computer is unable to communicate over the wireless LAN through the at least one access point using the first wireless communication interface.

7. A method of operating a first computer adapted to be a host on wireless LAN, the wireless LAN having at least one access point, the method comprising:
   a) attempting, by the first computer, to communicate over the wireless LAN through the at least one access point;
   b) in response to detecting that the first computer is unable to communicate over the wireless LAN, automatically forming a request for diagnostic information and transmitting, by the first computer unable to communicate over the wireless LAN, the request for diagnostic information to at least one second computer adapted to be a host on the wireless LAN;
   c) analyzing, by the first computer unable to communicate over the wireless LAN, diagnostic information received from the at least one second computer adapted to be a host on the wireless LAN to identify a condition preventing the first computer from communicating over the wireless LAN; and
   d) taking, by the first computer unable to communicate over the wireless LAN, one or more corrective actions based at least in part on the condition identified in c).

8. The method of claim 7, further comprising transmitting a beacon signal to establish communication with the at least one second computer.

9. The method of claim 8, further comprising selecting as the at least one second computer a computer that is also unable to communicate over the wireless LAN through the at least one access point.

10. The method of claim 9, wherein the diagnostic information comprises information obtained by the at least one second computer from a third computer adapted to be a host on the wireless LAN.

11. The method of claim 7, additionally comprising receiving over a wireless link the diagnostic information from the at least one second computer.

12. The method of claim 11, wherein the diagnostic information received from the at least one second computer comprises a single packet defining a communication status of the at least one second computer.

13. The method of claim 7, wherein taking one or more corrective actions comprises adjusting one or more communication settings and/or parameters.

14. A computer-readable storage device having computer-executable instructions for use on a first computer adapted to be a host on a wireless LAN, the wireless LAN having at least one wireless access point, the computer-executable instructions for performing steps comprising:
   a) communicating, by the first computer, through the at least one wireless access point;
   b) deriving status information about communication over the wireless LAN through the at least one wireless access point from information generated by communication hardware of the first computer and/or communication software of the first computer, wherein the status information comprises an average parameter value over a period of time based on parameter values generated by the communication hardware and/or software of the first computer and an identification of at least one authentication mechanism used by the first computer to associate with the at least one wireless access point; and
   c) receiving a request for status information from at least one second computer adapted to be a host on the wireless LAN but is unable to communicate over the wireless LAN and transmitting the status information comprising the average parameter value and the identification of the at least one authentication mechanism over a wireless connection to the at least one second computer in response to the request for status information from the at least one second computer, the wireless connection not through the at least one wireless access point.

15. The computer-readable storage device of claim 14, wherein the status information comprises an access code and the computer-executable instructions are for performing additional steps comprising:
   d) obfuscating the access code before transmission to the at least one second computer.

16. The computer-readable storage device of claim 14, wherein the computer-executable instructions are for performing additional steps comprising:
   d) using a first interface to communicate over the wireless LAN through the at least one wireless access point.

17. The computer-readable storage device of claim 14, wherein the computer-executable instructions for performing the step of deriving status information comprise computer-executable instructions for:
   i) obtaining information about the wireless layer of the wireless LAN, the information comprising: the type of network interface card installed in the first computer, BSSID's of access points from which the first computer has received a beacon, a representation of the loss rate of packets exchanged between the first computer and the at least one wireless access point, a security protocol used to communicate with the wireless network through the at least one wireless access point, and/or the length of an interface queue on the first computer.

18. The computer-readable storage device of claim 17, wherein the computer-executable instructions for performing the step of deriving status information comprise computer-executable instructions for:
   i) obtaining information about the IP layer of the wireless LAN, the information comprising: an IP Address of an interface to the at least one wireless access point, an IP address of a DHCP server from which the first computer obtained an IP address on the wireless LAN, and/or an IP address of a local DNS server on the wireless LAN.

19. The computer-readable storage device of claim 18, wherein the computer-executable instructions for performing the step of deriving status information comprise computer-executable instructions for:
   i) obtaining information about the transport layer of the wireless LAN, the information comprising: information indicative of the number of connections through the wireless LAN attempted by the first computer, the number of connections through the wireless LAN attempted by the first computer that failed, and/or server ports used by the first computer for successful connections through the wireless LAN.

20. The computer-readable storage device of claim 19, wherein the computer-executable instructions for performing the step of deriving status information comprise computer-executable instructions for:
   i) obtaining information about the application layer of the wireless LAN, the information comprising at least one web proxy setting.

* * * * *